United States Patent
Mairs et al.

(10) Patent No.: US 9,736,666 B2
(45) Date of Patent: Aug. 15, 2017

(54) CONTROLLING COMMUNICATIONS EQUIPMENT

(71) Applicant: Metaswitch Networks Ltd., Enfield, Middlesex (GB)

(72) Inventors: Chris Mairs, Middlesex (GB); Liz Rice, Middlesex (GB); Philip Pearl, Middlesex (GB); Felix Palmer, Bristol (GB); David Drysdale, London (GB); Shaun Crampton, Middlesex (GB)

(73) Assignee: METASWITCH NETWORKS LTD, Enfield (GB)

( * ) Notice: Subject to any disclaimer, the term of this patent is extended or adjusted under 35 U.S.C. 154(b) by 0 days.

(21) Appl. No.: 14/138,111

(22) Filed: Dec. 22, 2013

(65) Prior Publication Data
US 2014/0106720 A1   Apr. 17, 2014

Related U.S. Application Data

(63) Continuation of application No. PCT/GB2012/051472, filed on Jun. 22, 2012.
(Continued)

(51) Int. Cl.
*H04M 3/42* (2006.01)
*H04W 4/16* (2009.01)
(Continued)

(52) U.S. Cl.
CPC ........... *H04W 4/16* (2013.01); *H04L 65/1069* (2013.01); *H04L 65/1096* (2013.01);
(Continued)

(58) Field of Classification Search
CPC .... H04W 3/42042; H04W 1/57; H04W 1/575
See application file for complete search history.

(56) References Cited

U.S. PATENT DOCUMENTS

| 7,117,001 B2 | 10/2006 | Lin et al. |
| 2008/0146256 A1 | 6/2008 | Hawkins et al. |

(Continued)

FOREIGN PATENT DOCUMENTS

WO   2009/009167   1/2009

OTHER PUBLICATIONS

Skype webpage—https://support.skype.com/en-us/faq/FA20/How-do-l-call-phones-and-mobiles, retrieved Jan. 2009.
(Continued)

*Primary Examiner* — Justin Lee
(74) *Attorney, Agent, or Firm* — EIP US LLP

(57) ABSTRACT

Communications equipment associated with a calling party in a telecommunications network has a telephony function for handling telephone calls and a data communication application for handling data communication sessions. The telephony function and the data communication application have an associated first and second user interface respectively. A called party identifier is collected via the second user interface in response to user input at the communications equipment. A telephone call is set up between the calling party and the called party using the telephony function on the basis of the collected called party identifier. Data communication session setup information, comprising information identifying the called party, is transmitted on the basis of the collected called party identifier. The data communication session setup information is for establishing a data communication session separate from the telephone call for the communication of data between the calling party and the called party.

12 Claims, 9 Drawing Sheets

Related U.S. Application Data

(60) Provisional application No. 61/499,824, filed on Jun. 22, 2011.

(51) Int. Cl.
*H04M 7/00* (2006.01)
*H04L 29/06* (2006.01)
*H04W 76/02* (2009.01)

(52) U.S. Cl.
CPC .... *H04L 65/4023* (2013.01); *H04M 3/42102* (2013.01); *H04M 7/0024* (2013.01); *H04W 76/021* (2013.01); *H04M 7/003* (2013.01); *H04M 7/0027* (2013.01); *H04M 7/0036* (2013.01); *H04M 2207/187* (2013.01)

(56) References Cited

U.S. PATENT DOCUMENTS

| | | | |
|---|---|---|---|
| 2008/0270611 A1 | 10/2008 | Noldus et al. | |
| 2011/0197138 A1* | 8/2011 | Mahmood | G06Q 10/00 715/738 |
| 2013/0308633 A1* | 11/2013 | Bergkvist et al. | 370/352 |

OTHER PUBLICATIONS

Fring Installation and User Guide version 4.x.x.x for iPhone / iPod touch, Apr. 2011.
International Search Report from parent PCT Application No. PCT/GB2012/051472 dated Oct. 2, 2012.
Viber for iPhone video, uploaded to youtube on Sep. 15, 2010. https://www.youtube.com/watch?v=UAVE8djwnTQ.

* cited by examiner

CONTROLLING COMMUNICATIONS EQUIPMENT

CROSS-REFERENCE TO RELATED APPLICATIONS

This application is a continuation under 35 U.S.C. §120 of International Patent Application No. PCT/GB2012/051472, filed Jun. 22, 2012 (and published in English as WO 2012175995), which claims the benefit of U.S. Provisional Patent Application No. 61/499,824, filed Jun. 22, 2011. Each of the above-referenced application is hereby incorporated by reference in its entirety.

BACKGROUND OF THE INVENTION

Field of the Invention

The present disclosure relates to a method of controlling communications equipment, a computer program product and communications equipment.

Description of the Related Technology

Communication between parties in a telecommunications network can be carried out in a number of ways. Most commonly, communication is carried out by a calling party dialing the telephone dialing number of a called party telephony device on a calling party telephony device. The dialing of the telephone number causes a call set-up process to be carried out in the network which results in the telephone of the called party ringing. If the called party chooses to answer their telephone, a telephone call can ensue between the calling party and the called party. The telephone call allows audio data such as speech data to be transferred along an audio channel created between the calling party telephony device and the called party telephony device.

Some telephony devices have enhanced capabilities which allow transfer of video data along a video channel created between the calling party telephone and the called party telephone. A video call may not be possible unless both the calling and called party telephone devices support video call functionality.

Audio or video conferencing may be carried out between three or more remote telephony devices, allowing communication of audio and/or video data between parties to the conference.

Web conferencing is also possible between multiple remote parties using devices with combined data processing, display and telephony capabilities. Web conferencing allows online meetings to be conducted for viewing and/or collaborating on common multimedia content.

Parties may also exchange text data by use of text messaging services such as the Short Message Service (SMS). Enhanced messaging services such as the Multimedia Messaging Service (MMS) allow parties to exchange image and video data in addition to text data.

The methods of communication described above provide a wide range of options for remote parties to communicate with each other. However, each method typically has different requirements in terms of device and/or network capability and interchanging between the different methods is either not possible or requires use of inconvenient set-up or configuration processes.

It would therefore be desirable to provide improved and convenient methods for communicating data between remote parties, including communication of data in a manner convenient to the parties.

SUMMARY

According to one embodiment, there is provided a method of controlling communications equipment in a telecommunications network. The communications equipment is associated with a calling party. The communications equipment may have a telephony function for handling telephone calls. The telephony function may have having an associated first user interface. The communications equipment may also have a data communication application for handling data communication sessions. The data communication application may have an associated second user interface. The method may include collecting a called party identifier via the second user interface associated with the data communication application in response to user input at the communications equipment. The method may further include setting up a telephone call between the calling party and a called party using the telephony function on the basis of the called party identifier collected by the data communication application. The method may further include transmitting data communication session setup information, comprising information identifying the called party, on the basis of the called party identifier collected by the data communication application. The data communication session setup information may be for establishing a data communication session separate from the telephone call for the communication of data between the calling party and the called party.

According to a second embodiment, there is provided a computer program product comprising a non-transitory computer-readable storage medium having computer-readable instructions stored thereon. The communications equipment may be associated with a calling party and may comprise a telephony function, for handling telephone calls and having an associated first user interface, and may comprise a data communication application, for handling data communication sessions and having an associated second user interface. The computer-readable instructions may be executable by the communications equipment to cause the communications equipment to perform a method. The method may include collecting a called party identifier via the second user interface associated with the data communication application in response to user input at the communications equipment. The method may further include setting up a telephone call between the calling party and a called party using the telephony function on the basis of the called party identifier collected by the data communication application. The method may further include transmitting data communication session setup information, comprising information identifying the called party, on the basis of the called party identifier collected by the data communication application. The data communication session setup information may be for establishing a data communication session separate from the telephone call for the communication of data between the calling party and the called party.

According to a third embodiment, there is provided communications equipment having a telephony function for handling telephone calls. The telephony function may have an associated first user interface. The communications equipment may further have a data communication application for handling data communication sessions. The data communication application may have an associated second user interface. The communications equipment may be associated with a calling party. The communications equipment may be configured to collect a called party identifier via the second user interface associated with the data communication application in response to user input at the communications equipment. The communications equipment may be further configured to set up a telephone call between the calling party and a called party using the telephony function on the basis of the called party identifier collected by the data communication application. The communications equipment may be further configured to transmit data communication session setup information, comprising information identifying the called party, on the basis of the called party identifier collected by the data communication application, into a telecommunications network. The data communication session setup information may be for establishing a data communication session separate from the telephone call for the communication of data between the calling party and the called party.

Further features and advantages will become apparent from the following description of preferred embodiments of the invention, given by way of example only, which is made with reference to the accompanying drawings.

DETAILED DESCRIPTION OF CERTAIN INVENTIVE EMBODIMENTS

Figure 1:
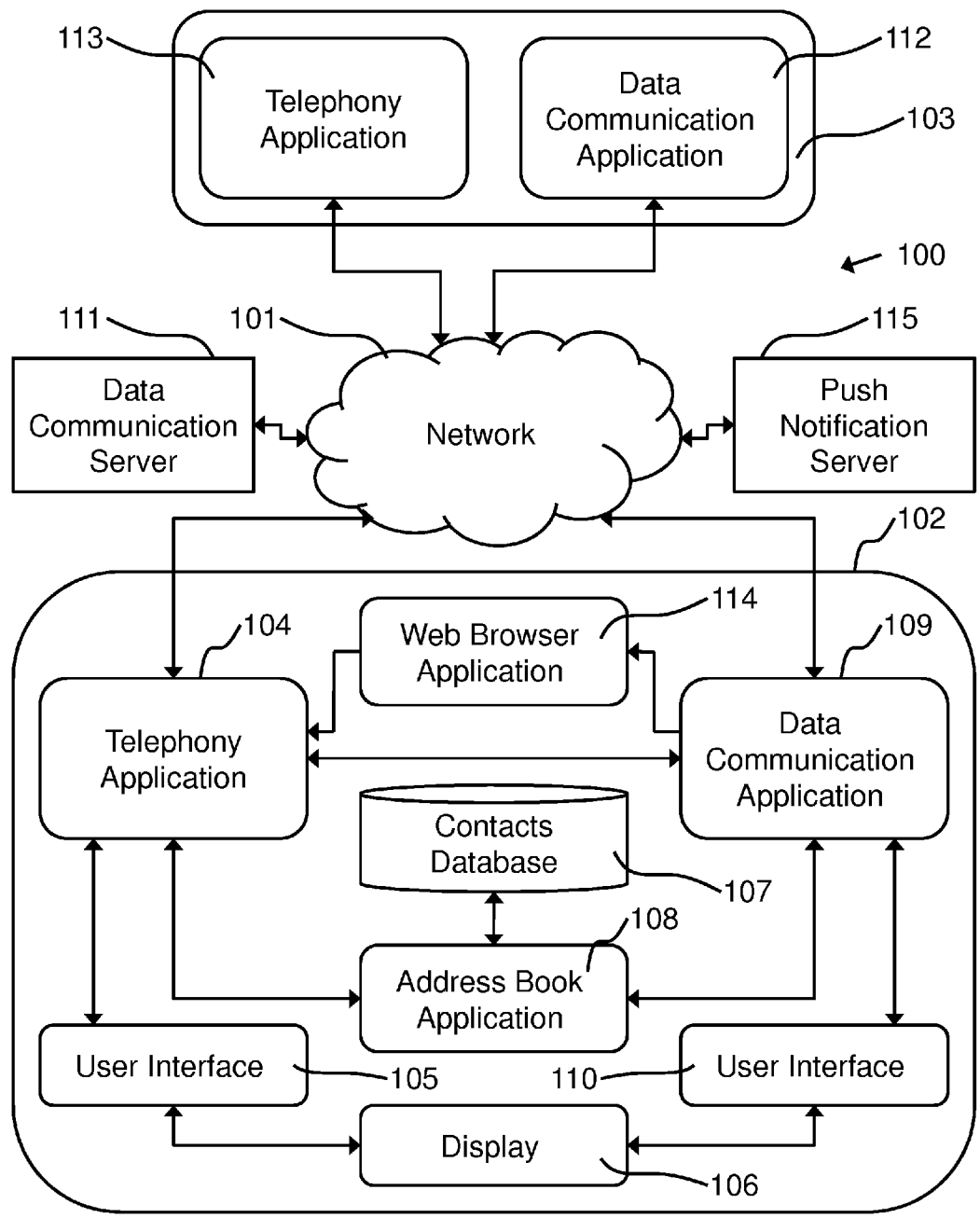
FIG. 1 is a schematic block representation of a telecommunications system according to some embodiments.

FIG. 1 is a schematic block representation of a telecommunications system 100.

The telecommunications system 100 comprises a telecommunications network 101 which provides telephony and data communication services to communications equipment 102 associated with a calling party and communications equipment 103 associated with a called party. In reality, the telecommunications system 100 provides such telecommunications services to communications equipment other than just the calling party communications equipment 102 and the called party communications equipment 103.

The telecommunications network 101 may comprise one or more of a Public Land Mobile Network (PLMN), a Public Switched Telephone Network (PSTN), an Internet Protocol (IP) network or the like. In such cases, the telecommunications network 101 comprises one or more media and/or signaling gateway entities (not shown) for performing conversion between the various protocols and data formats used to transfer media and signaling data within and between the different networks parts.

In some embodiments described herein, the calling party communications equipment and called party communications equipment 102, 103 are smart mobile telephones that support a variety of different communication methods, including telephony functionality enabling their respective users to conduct incoming and outgoing telephone calls with one or more remote users in the telecommunications network 101. The calling and called party mobile telephones 102, 103 comprise a number of components (not shown) which are known in the art, the operation of which is not described here in detail, including one or more radio frequency transceiver(s) and aerial(s), a speech coder/decoder connected to a loudspeaker and a microphone, and, in some embodiments, a removable Subscriber Identity Module (SIM) connected via electrical contacts. The calling and called party mobile telephones 102, 103 also include data transfer capabilities, including data packet input/output via a data input-output interface (not shown).

In some embodiments described herein, the calling and called party communications equipment 102, 103 are smart mobile telephones, for example Apple™ iPhones™, that comprise memory storage and one or more processors (not shown) for data processing purposes including implementation of an operating system, for example the Apple™ iOS™ operating system. The operating system provides a platform for execution of application software (or 'applications' or 'apps') that allow their respective users to perform different tasks on the mobile telephones 102, 103. The applications may be installed during manufacture of the mobile telephones 102, 103 or may be downloaded and installed after manufacture.

The calling party mobile telephone 102 includes a telephony function 104 that is responsible for handling signaling for telephone calls in which the mobile telephone 102 is involved. For example, the telephony function 104 may be used to initiate outgoing telephone call setup requests from, and handle incoming telephone call setup requests to, the mobile telephone 102.

In some embodiments, the telephony function is provided by a telephony application 104. The telephony application 104 may form part of the operating system running on the mobile telephone 102 or may be downloaded onto the mobile telephone 102 after the operating system has been installed. The telephony application 104 interacts with a user by receiving user input via a telephony application user interface 105 and by providing visual content to the user via a display 106. The mobile telephone 102 may include a touch-sensitive screen that provides both user interface and display functionality.

There are various ways in which the telephony application 104 can initiate telephone call setup. For example, the calling party can manually enter a called party identifier, such as a telephone dialing number, associated with the called party. Alternatively, the calling party may have already stored a called party identifier associated with the called party in a contacts database 107 at the mobile telephone 102. In such cases, the telephony application 104 can retrieve the stored called party identifier in response to corresponding user input using an Application Programming Interface (API) of an address book application 108 that manages access to the contacts database 107. In this way, the user does not have to enter the called party identifier manually into the telephony application 104.

As explained above, in addition to telephony capabilities, the mobile telephone 102 has data transfer capabilities. The user of the mobile telephone 102 may subscribe to additional communications services that employ the data connectivity capabilities of the mobile telephone 102. The user of mobile telephone 102 wishes to subscribe to communications services provided by a communication service provider. This may provide additional in-call services to the users of the mobile telephones 102, 103 that are not conventionally available during a telephone call or require significant user interaction with the mobile telephones 102, 103 to access and use such services. For example, the services may include in-call file-sharing, in-call location-sharing and in-call contact-sharing.

In order to use the communications services, the subscribing user downloads a data communication application 109 onto the mobile telephone 102 to access the communications services provided by the communication service provider. Similarly to the telephony application 104, the data communication application 109 interacts with a user by receiving user input via a data communication application user interface 110 and provides visual content to the user via the display 106. As explained above, the mobile telephone 102 may comprise a touch-sensitive screen which can provide both user interface and display functionality.

In addition to the data communication application 109, a communications service provider has a data communication server 111 in the telecommunications system 100. The data communication server 111 is responsible for managing certain data communication sessions in the telecommunications network 101 between subscribers to the communications service provided by the communications service provider. The data communication server 111 communicates and cooperates with the data communication application 109 via the telecommunications network 101 to establish a connection for the communication of data between the mobile telephone 102 and the data communication server 111. Such a connection may be, for example, a HyperText Transfer Protocol (HTTP) or a HyperText Transfer Protocol Secure (HTTPS) connection.

The data communication server 111 can also establish a similar connection with the mobile telephone 103 which includes a data communication application 112 provided by the communication service provider and a telephony function 113 which may form part of an operating system running on the mobile telephone 103.

In addition to establishing individual connections to the mobile telephones 102, 103, the data communication server 111 can join the individual connections together to provide a channel for the communication of data between the mobile telephones 102, 103.

Such joining may be based on the data communication server 111 determining that that the mobile telephones 102, 103 are both involved in the same telephone call. In order to determine that the two mobile telephones 102, 103, with which the data communication server 111 has already established individual connections, are involved in the same telephone call—when that is the case—the data communication application 109 is configured to transmit call party details of parties for a telephone call in which the mobile telephone 102 is involved to the data communication server 111. The data communication session service provider can then identify the parties that are involved in the telephone call and, if they are subscribers to the service provided by the data communication server 111, can establish a data communication session for the communication of data between the parties involved in the call. This data communicated between the parties may be transmitted via a communications path which includes the data communication server 111. In some embodiments, each of the mobile telephones 102, 103 sets up a separate connection with the data communication server 111, which correlates the two connections using call party details provided by each mobile telephone 102, 103, as will be explained below, and then bridges the two connections and/or intermediates between the mobile telephones 102, 103 during the data communications session. Alternatively, after the mobile telephones 102, 103 have contacted the data communication server 111, and the mobile telephones 102, 103 have been correlated, the data communication server 111 may provide one or each party contact details, for example an IP address or other contactable address, for the other party or parties, whereby a direct connection can be made between the two mobile telephones 102, 103 for the duration of the data communication session, thereby bypassing the data communication server 111.

As such, the data communication application 109 running on mobile telephone 102 detects that there is a call in progress between the calling party and the called party and notifies the data communication server 111 of call party details for the call, for example the calling party identifier and the called party identifier. The data communication server 111 identifies the call party details in the notification from mobile telephone 102 and establishes a separate data communications session, separate from the telephone call, for the communication of data between the calling and called parties.

The separate communications session is established on the basis of the received call party details; the calling party identifier and the called party identifier. The separate communications session is established whilst the telephone call is in progress, and is continued in parallel with the telephone call, such that voice call data is transmitted via the telephone call and other data may be transmitted via the communications session, after the establishment of the separate communications session.

The data communication server 111 updates the records for mobile telephone 102 and mobile telephone 103 to indicate that a call is in progress between mobile telephone 102 and mobile telephone 103 and that a communications session between mobile telephone 102 and mobile telephone 103, separate to the voice call between mobile telephone 102 and mobile telephone 103, has been established.

If, for example, the calling party wants to communicate data to (for example share data with) the called party, it transmits the data to the data communication server 111. The data communication server 111 performs a lookup using the calling party identifier for mobile telephone 102 and identifies that a communications session has been established between mobile telephone 102 and mobile telephone 103. The data communication server 111 retrieves the called party identifier for mobile telephone 103 and transmits the data received from mobile telephone 102 to mobile telephone 103 using the retrieved called party identifier.

In some embodiments, the communication session is established in the form of a client-server relationship, with the data communication server 111 acting as the server and each of mobile telephone 102 and mobile telephone 103 acting as clients. One connection is created between the data communication server 111 and mobile telephone 102 and another connection is created between the data communication server 111 and mobile telephone 103. The two connections together create a channel between mobile telephone 102 and mobile telephone 103 through which data can be communicated in either direction.

To avoid loss of the channel between mobile telephone 102 and mobile telephone 103, the connections can be maintained by maintenance messages ('heartbeats') transmitted from the data communication server 111 to mobile telephone 102 and mobile telephone 103, for example transmitted at periodic intervals sufficiently short to prevent time-out of the connections due to inactivity.

In some embodiments, the communications session between mobile telephone 102 and mobile telephone 103 can be maintained after the voice call is terminated allowing the calling party and the called party to continue communicating data between mobile telephone 102 and mobile telephone 103.

As explained above, to initiate a telephone to a called party, the telephony application 104 conventionally receives user input via the telephony application user interface 105, identifies the called party with whom the calling party wishes to communicate, and then initiates telephone call setup by transmitting telephone call setup information that identifies the called party into the telecommunications network 101 in a manner known to those skilled in the art.

In some cases, the telephony application 104 may be able to provide call party details, including one or both the calling and called party identifier, to the data communication application 109. For example, the data communication application 109 may be able to request call party details via a telephony application API. In such cases, the data communication application 109 can then transmit data communication session setup information, identifying the called party, to the data communication server 111 so that the data communication server 111 can identify the parties involved in the telephone call and establish a data communication session separate from the telephone call for the communication of data between the calling party and the called party.

In some other cases, the data communication application 109 may be unable to receive certain data, including call party details, from the telephony application 104. In such cases, the data communication application 109 may be unable to identify all of the call party details (unless the user of the mobile telephone 102 were to input the call party details manually). In particular, on the calling party side, the called party identifier may be unknown, and inaccessible, to the data communication application 109; and on the called party side, the calling party identifier may be unknown, and inaccessible, to the data communication application 112. The data communication application 109 may therefore be unable to provide each of the call party details to the data communication server 111, and the data communication server 111 would then have difficulty in positively correlating the two call parties, since it would have insufficient information to determine that both parties were in the same telephone call.

In such other cases, instead of the conventional approach of using the telephony application user interface 105 to initiate telephone call setup to the called party, the data communication application 109 includes a further user interface 110 with which the calling party can interact to collect the called party identifier and by means of which the calling party can initiate telephone call setup to the called party. The data communication application 109 can then transmit an instruction, comprising the called party identifier, to the telephony application 104. The telephony application 104 then transmits telephone call setup information, comprising the called party identifier, into the telecommunications network 101 to initiate setup of a telephone call between the calling party mobile telephone 102 and the called party mobile telephone 103.

In addition to transmitting the instruction comprising the called party identifier to the telephony application 104, the data communication application 109 transmits data communication session setup information to the data communication server 111 so that the data communication server 111 can identify the called party. The data communication session setup information includes data corresponding to the collected called party identifier—it may comprise the called party identifier itself or may identify the called party in some other manner, based on the collected called party identifier.

For example, the called party may be associated with a first called party identifier, for example a telephone dialing number, which is used to setup a telephone call with the called party and a second, different called party identifier, for example a subscriber name for the communications service provided by the data communication server 111, which is used to setup a data communication session with the called party. Preferably, however, the same called party identifier, for example a telephone dialing number, could be used to setup both the telephone call and the separate data communication session with the called party.

In some cases, the data communication application 109 may be able to provide the called party identifier to the telephony application 104 directly, for example via a telephony application API.

In other cases, the data communication application 109 may not be able to send the called party identifier directly to the telephony application 104. In such other cases, the data communication application 109 may transmit a first instruction comprising the called party identifier to an intermediate application, such as a web browser application 114, which then transmits a second instruction comprising the called party identifier to the telephony application 104 to initiate telephone call setup to the called party.

The first instruction to the web browser application 114 may be in the form of a Uniform Resource Locator (URL) (sometimes referred to as a phone link) which includes the called party identifier and a URL-type identifier (such as tel://) which indicates that the URL is an instruction to initiate telephone call setup to the called party. Upon receiving the URL, the web browser application 114 determines from the URL-type identifier that the URL is an instruction to initiate a telephone call, identifies the called party identifier in the URL and then transmits the second instruction, including the called party identifier, to the telephony application 104 to initiate telephone call setup to the called party. In response to receiving the second instruction and the called party identifier from the web browser application 114, the telephony application 104 initiates telephone call setup to the called party by transmitting telephone call setup information comprising the called party identifier into the telecommunications network 101.

As explained above, the mobile telephones 102, 103 implement an operating system that provides a platform for execution of applications, such as the telephony applications 104, 113, the data communication applications 109, 112 and the web browser application 114, that allow users to perform different tasks on the mobile telephones 102, 103.

In some operating systems, particularly in the case of mobile telephone operating systems, only one application (often called the 'active' application) can run in the foreground and be displayed to a user at any given time. In some cases, only a single application—the active application—may run at any given time. When a user exits an application in such cases, the exited application is terminated and removed from working memory.

In other cases, other applications may be able to run in the background and execute code while the active application runs in the foreground. When a user exits an application in such other cases, the exited application remains in memory in the background, possibly only for a predetermined amount of time before it is suspended and is unable to execute code. The user can switch between the active, foreground and non-active, background applications to interact with a desired application.

Such multitasking-type capabilities may increase complexity and memory usage, but users may benefit from multiple running applications, for example so that the user can listen to music via a media player application in the background while also simultaneously preparing an e-mail in an e-mail application instead of having to choose to do one or the other. Generally, a user may force termination of a foreground or background application via appropriate input, which terminates the application.

In some cases, an application may be active and running in the foreground when an interruption, such as an incoming call request or Short Messaging Service (SMS) message, occurs. In such cases, the application may remain in the foreground, but may be transitioned to an inactive state in which it does not receive system events, but may still execute other code. The operating system may display an alert to the user informing the user of the interruption. Based on the user's response to the alert, the application may be transitioned back to an active state or may be moved to a background state while the user actions the interruption.

In other cases, the application may be in the background when the interruption occurs. If the application is in the background in a suspended state, it may not be informed of system events including the occurrence of the interruption. However, in some cases, the application may be in the background but may still execute code and become aware of system events including the occurrence of notifications. For example, the application may declare that it plays audio (stored locally or streamed audio) while in the background and, as such, should not be moved into the suspended state because the audio playback would be terminated. Such declaration enables the application to run in the background, even if another application is active in the foreground, and be informed of system events, such as the occurrence of an incoming telephone phone call or SMS message. Other declarations may enable an application to run in the background for extended periods of time, including declarations that the application needs to be kept aware of the current location of the mobile phone or that it is a Voice over Internet Protocol (VoIP) application that needs to monitor incoming VoIP calls to the application.

Applications that are in the background state, whether still running or in a suspended state, may be able to receive notification of the occurrence of a particular system event even though they are not the active application running in the foreground.

Such events may be local in that they relate to an event occurring at the mobile telephone on which the application is installed. A local event may be a local interruption such as an incoming telephone call setup request or an SMS message being received at the mobile telephone. Local events can be notified to the application by means of a local notification from the operating system.

Alternatively, the application can monitor the state of a particular function on the mobile telephone. For example, in iOS 4.0, an application may monitor a call state by using the CTCallState object to determine the state of a call. The call state may be a 'dialing' call state (CTCallStateDialing) before a telephony connection is established between the mobile telephone and a remote telephony party, an 'incoming' call state (CTCallStateIncoming) when the mobile telephone receives an incoming telephony connection request, but the user has accepted the telephony connection request, a 'connected' call state (CTCallStateConnected) in which the telephone call is established between the mobile telephone and the remote telephony party, and a 'disconnected' call state (CTCallStateDisconnected) which is the call state upon termination of the telephone call between the mobile telephone and the remote telephony party.

Instead of being local events, events may be remote in that they relate to an event occurring outside the mobile telephone on which the application is installed. A remote event may be the receipt of new data at a remote server, such as the data communication server 111. Remote events can be notified to the application by means of a remote (or 'push') notification from a remote destination, such as a push notification server 115. Push notifications are transmitted from the push notification server 115, which may, for example, implement the Apple Push Notification Service (APNS), without the application having to request the notification. This can be contrasted with data or notifications that are requested from a remote server, such as an e-mail or web page server, which are typically fetched from the remote server in response to an explicit user request, such as a request to check for new e-mails or a request to retrieve a particular web page, or at periodic intervals, particularly in the case of checking for new e-mails.

Push notifications can be beneficial where the user should not be expected to request notification of a remote event manually and/or where the predetermined time period between automatic fetching requests would be unsuitable in the circumstances.

An application may register to receive push notifications with the operating system. The operating system provides the application with a device token identifying the mobile telephone on which it is installed, which the application provides to the service provider that provides the application. For example, the data communication application 109 may register to receive push notifications and may transmit a device token to the data communication server 111.

To receive push notifications, the mobile telephone 102, 103 establishes a persistent connection with the push notification server 115 to receive all push notifications to that mobile telephone 102, 103.

To send a push notification to a particular mobile telephone 102, 103 a service provider, such as the data communication server 111, establishes a secure communication channel with the push notification server 115 via the telecommunications network 101 and transmits a notification identifying the particular mobile telephone 102, 103 and including a data payload to the push notification server 115 via the secure communication channel. The push notification server 115 may be configured to acknowledge or not to acknowledge receipt of the notification from the service provider. The push notification server 115 then pushes a notification to the particular mobile telephone 102, 103 via the persistent connection. If no data connection is available (for example if data connectivity has been disabled or is otherwise unavailable at the mobile telephone 102, 103), the push notification will not be delivered to the mobile telephone 102, 103. It may, however, be queued at the push notification server 115 and delivery reattempted once a data connection with the mobile telephone 102, 103 is established.

When the operating system receives a push (or local) notification directed to the application and the application is not an active application running in the foreground, the operating system provides the notification to the user in the form of an on-screen alert message and prompts the user to indicate how they wish to handle the alert; typically by either indicating that they wish to ignore the alert (in which case the application remains in the background) or that they wish to action the alert (in which case the notification is passed to the application and the application is brought to the foreground if it is not already running in the foreground).

Figure 2:
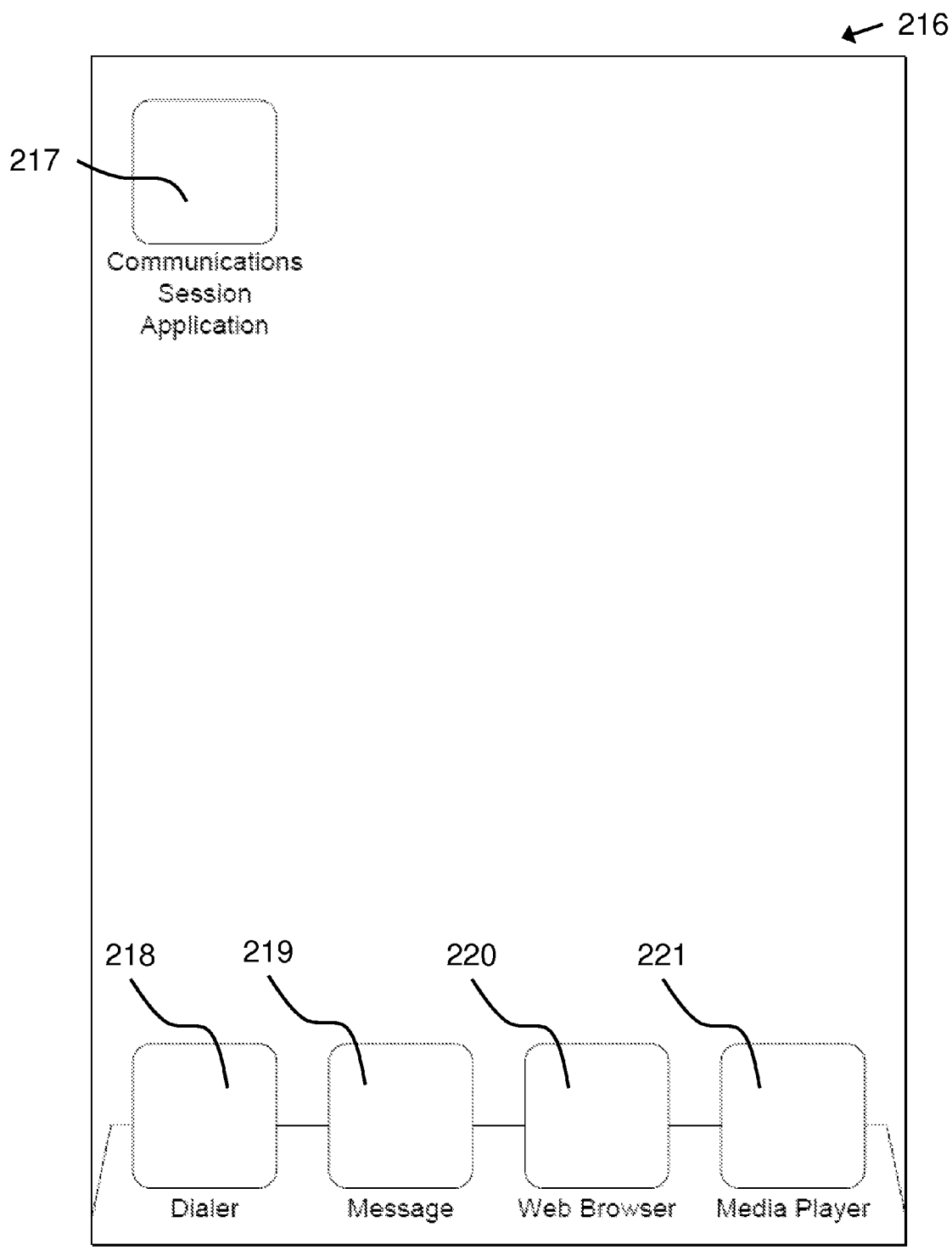
FIG. 2 is a representation of an application selection screen according to some embodiments.

FIG. 2 is a representation of an application selection screen 216 displayed by the operating system on the display 106 of the mobile telephone 102 according to some embodiments.

The application selection screen 206 includes a touch-sensitive screen region 217 which displays an icon representing the data communication application 109. User input within the touch-sensitive screen region 217 is passed to the operating system running on the mobile telephone 102, which interprets the input as being a request to activate the data communication application 109. The data communication application 109 may already be running on the mobile telephone 102 in a suspended or background state, in which case it is brought to the foreground so that the user can interact with it. In other cases, the data communication application 109 may not already be running on the mobile telephone 102, in which case the operating system loads the data communication application 109 and displays it in the foreground so that the user can interact with it.

The application selection screen 216 includes several other touch-sensitive screen regions 218, 219, 220, 221, each including a respective icon representing other applications installed on, or forming part of the operating system of, the mobile telephone 102. In this case, touch-sensitive screen region 218 displays an icon representing the telephony application 104, touch-sensitive screen region 219 displays an icon representing a messaging application that forms part of the operating system, touch-sensitive screen region 220 displays an icon representing the web browser application 114 and touch-sensitive screen region 221 displays an icon representing a media player application that forms part of the operating system.

Figure 3:
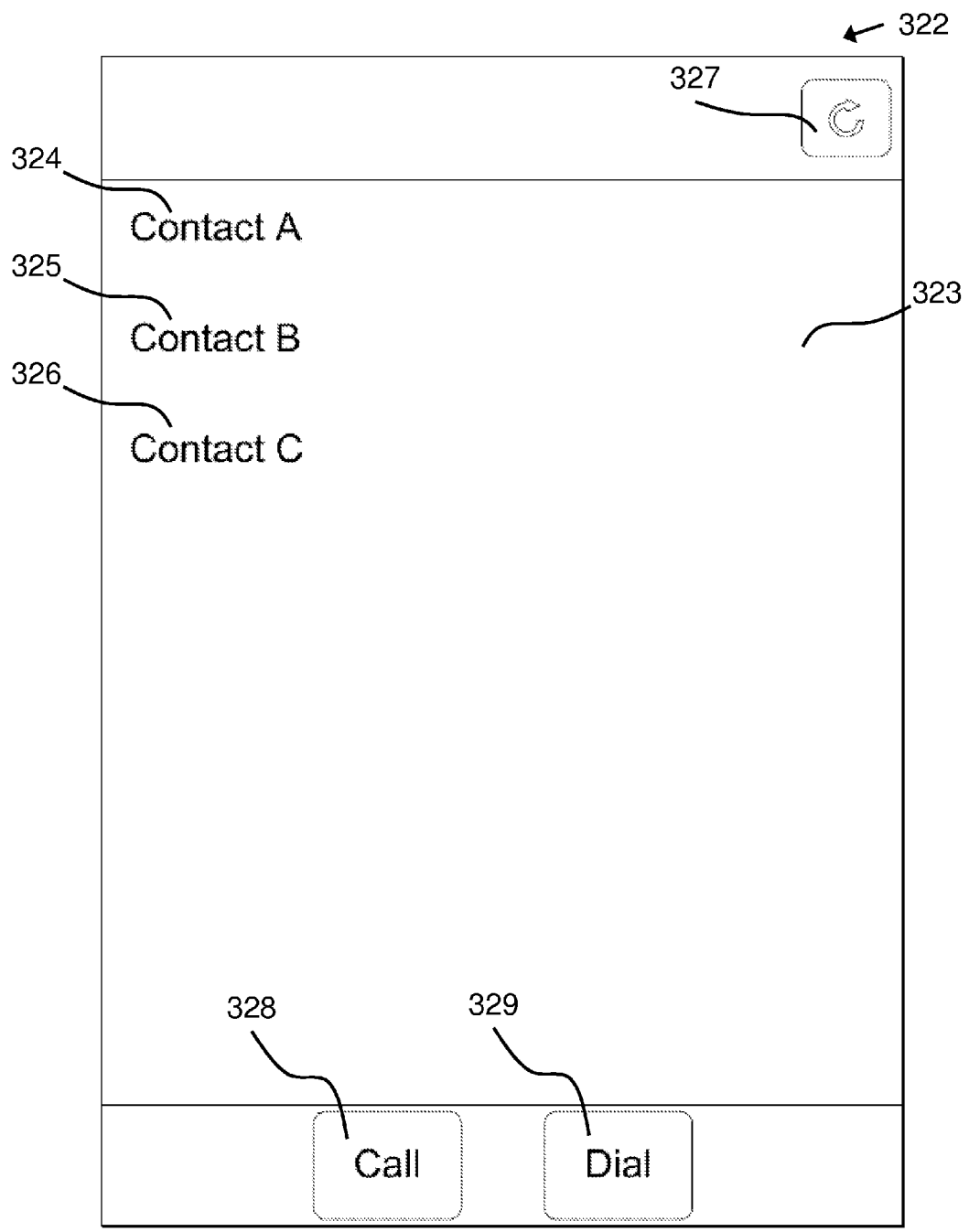
FIG. 3 is a representation of a subscriber selection screen according to some embodiments.

FIG. 3 is a representation of a subscriber selection screen 322 displayed by the data communication application 109 on the display 106 of the mobile telephone 102 according to some embodiments.

The subscriber selection screen 322 includes a subscriber information display region 323 that identifies which of the user's contacts are also subscribers to the service provided by the communication service provider associated with the data communication application 109 and the data communication server 111. The names of the subscribing contacts (indicated as "Contact A", "Contact B" and "Contact C") are retrieved from the contacts database 107 via an address book API and are displayed as user interface elements in respective touch-sensitive screen regions 324, 325, 326 within the subscriber information display region 323.

To determine which of the user's contacts are subscribers to the services provided by the communication service provider, the data communication application 109 retrieves contact information from the contacts database 107 via an address book API and transmits the retrieved contact information to the data communication server 111. The retrieved contact information may comprise a set of telephone numbers associated with the user's contacts. The data communication server 111 compares the contact information with contact information for subscribers to the service provided by the communication service provider, determines whether any of the user's contacts are also subscribers and informs the data communication application 109 accordingly.

The list of subscribers may be updated periodically, for example on each occasion on which the user loads the data communication application 109. Alternatively or additionally, the user can manually invoke updating of the list of subscribers by touching a touch-sensitive screen region 327 displaying an update or refresh button.

User input within any one of the touch-sensitive screen regions 324, 325, 326 associated with contacts A, B and C respectively is passed to the data communication application 109. The data communication application interprets the user input to identify the subscribing contact A, B, C with whom the user wishes to communicate (based on determining which whether the user input was in touch-sensitive screen region 324, 325 or 326). Once the selected subscribing contact A, B, C has been identified, the data communication application 109 retrieves an identifier, such as a telephone dialing number, associated with the selected contact A, B, C.

The contact selection screen 322 includes two further touch-sensitive screen regions 328, 329 which are used to navigate around the data communication application 109. One of the touch-sensitive screen regions 328 displays an icon representing the subscribing contact selection screen 322. The other touch-sensitive screen region 329 displays an icon representing a keypad screen by means of which the user can manually identify a called party with whom they wish to communicate. Manual entry may be necessary if the called party does not have an entry in the contacts database 107 and, therefore, is not displayed in the list of subscribing contacts in the subscriber information display region 323.

In the embodiments described herein, it is assumed that the user wishes to communicate with contact C who is associated with mobile telephone 103. Unless the context dictates otherwise, contact C is referred to generally as the called party and the user of mobile telephone 102 is generally referred to as the calling party.

Figure 4:
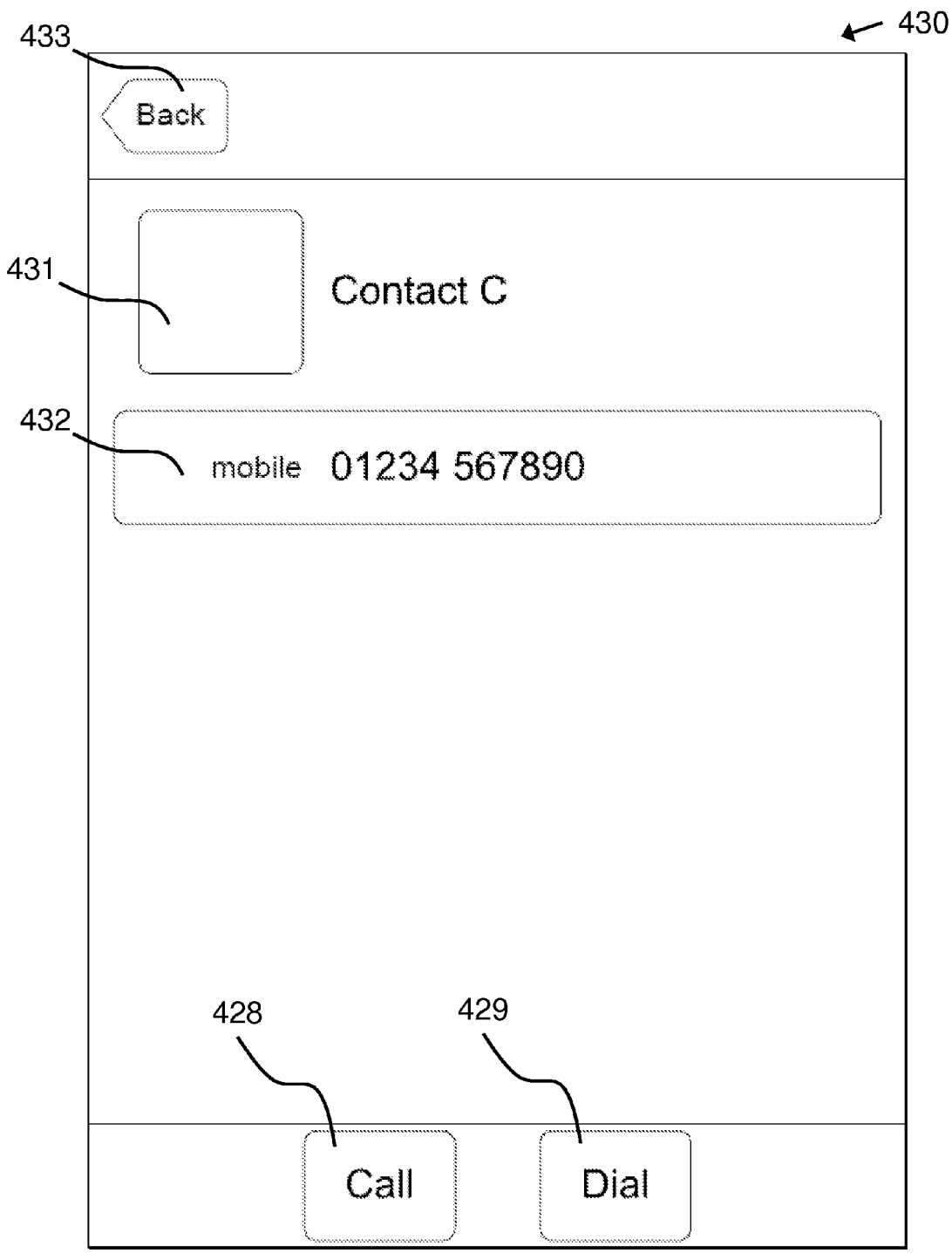
FIG. 4 is a representation of a telephone call initiation screen according to some embodiments.

FIG. 4 is a representation of a telephone call initiation screen 430 displayed by the data communication application 109 on the display 106 of the mobile telephone 102 according to some embodiments. FIG. 4 shows the situation in which the user has touched the touch-sensitive screen region 326 of the subscriber selection screen 322 corresponding to contact C (shown in FIG. 3). Such user input is passed to the data communication application 109 which, in response to the user input, displays the telephone call initiation screen 430 so that the user can confirm that they wish to initiate telephone call setup with contact C.

The telephone call initiation screen 430 includes a contact information display region, generally designated by reference 431, that displays the name of the selected contact, in this case "Contact C" alongside an image associated with contact C. The contact name and image may be retrieved from the contacts database 107, the data communication server 111 or elsewhere.

The telephone call initiation screen 430 also includes a user interface element in the form of touch-sensitive screen region 432 that displays a telephony identifier associated with contact C. User input in the touch-sensitive screen region 432 is passed to the data communication application 109. The data communication application 109 interprets user input within the touch-sensitive screen region 432 as being a request to initiate telephone call setup with contact C and causes the data communication application 109 to transmit an instruction, comprising the telephony identifier associated with contact C, to the telephony application 104 to initiate telephone call setup to contact C. In this case, the telephony identifier is a mobile telephone dialing number. However, it will be appreciated that other forms of identifier such as a Session Initiation Protocol (SIP) Uniform Resource Identifier (URI) or the like may be used to identify contact C.

The telephone call initiation screen 430 also includes a touch sensitive-screen region 433 displaying the text "Back" that is used to navigate back to the previous screen (in this case the subscriber selection screen 322 shown in FIG. 3). User input in the touch sensitive-screen region 433 is passed to the data communication application 109 and causes the data communication application 109 to display the previous screen 322, without initiating telephone call setup to contact C.

The telephone call initiation screen 430 also includes touch-sensitive screen regions 428, 429 that correspond to touch-sensitive screen regions 328, 329 of the subscriber selection screen 322.

Figure 5:
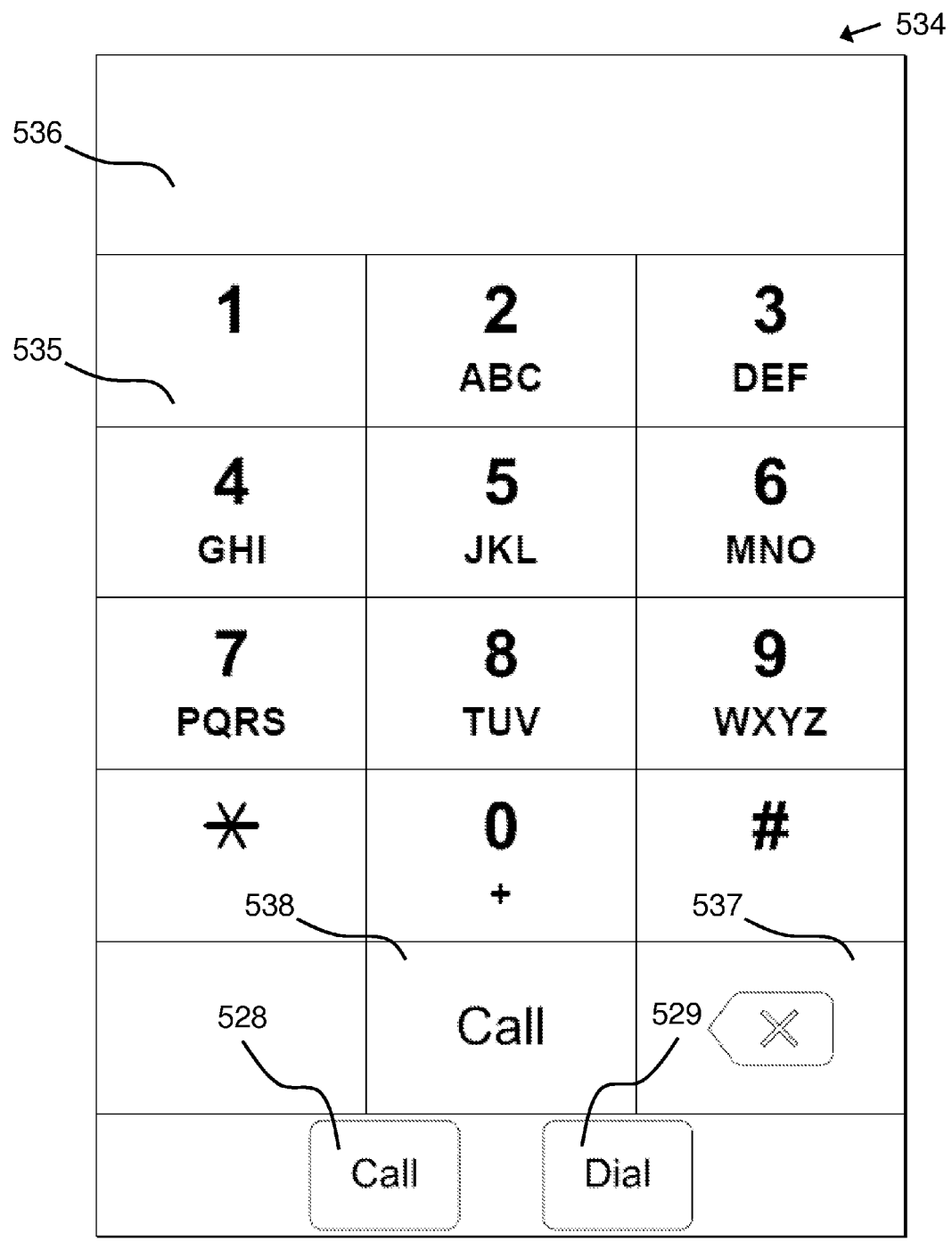
FIG. 5 is a representation of a manual identifier entry screen according to some embodiments.

FIG. 5 is a representation of a manual identifier entry screen 534 displayed by the data communication application 109 on the display 106 of the mobile telephone 102 according to some embodiments. FIG. 5 shows the situation in which the user has touched the touch-sensitive screen region 329 of the subscriber selection screen 322 or the touch-sensitive screen region 429 of the telephone call initiation screen 430 to effect manual identifier entry. Such user input within touch-sensitive screen region 329 or touch-sensitive screen region 429 is passed to the data communication application 109 which, in response to the user input, displays the manual identifier entry screen 534 so that the user can manually enter an identifier associated with a called party.

The manual identifier entry screen 534 includes a touch-sensitive keypad region 535 which displays various communication-related soft-keys including dial-pad digits 1, 2, . . . to 0 and the * ('star') and # ('hash') symbols which are used for entering telephone dialing numbers. The touch-sensitive keypad region 535 may include a mechanism (not shown) for entry of non-numeric symbols (such as may be found on a QWERTY keyboard) for facilitating entry of non-telephone dialing number telephony identifiers, such as a SIP URI.

As it is being entered by the user via the touch-sensitive keypad region 535, the identifier is displayed in an identifier confirmation display region 536 so that the user can check that they are entering the identifier correctly.

The manual identifier entry screen 534 includes a touch-sensitive screen region 537, which displays an icon representing a delete or backspace function. User input in the touch-sensitive screen region 534 is passed to the data communication application 109 and causes the data communication application 109 to ignore the previous user input via the touch-sensitive keypad region 535 and update the identifier confirmation display region 536 accordingly.

The manual identifier entry screen 534 includes a touch-sensitive screen region 538 that displays the text "Call". User input within the touch-sensitive screen region 538 is passed to the data communication application 109, which causes the data communication application 109 to transmit an instruction, comprising the called party identifier as displayed in the identifier confirmation display region 536, to the telephony application 104 so that the telephony application 104 can initiate telephone call setup to the desired called party.

The manual identifier entry screen 534 also includes touch-sensitive screen regions 528, 529 that correspond to touch-sensitive screen regions 328, 329 of the subscriber selection screen 322 and touch-sensitive screen regions 428, 439 of the telephone call initiation screen 430.

Figure 6:
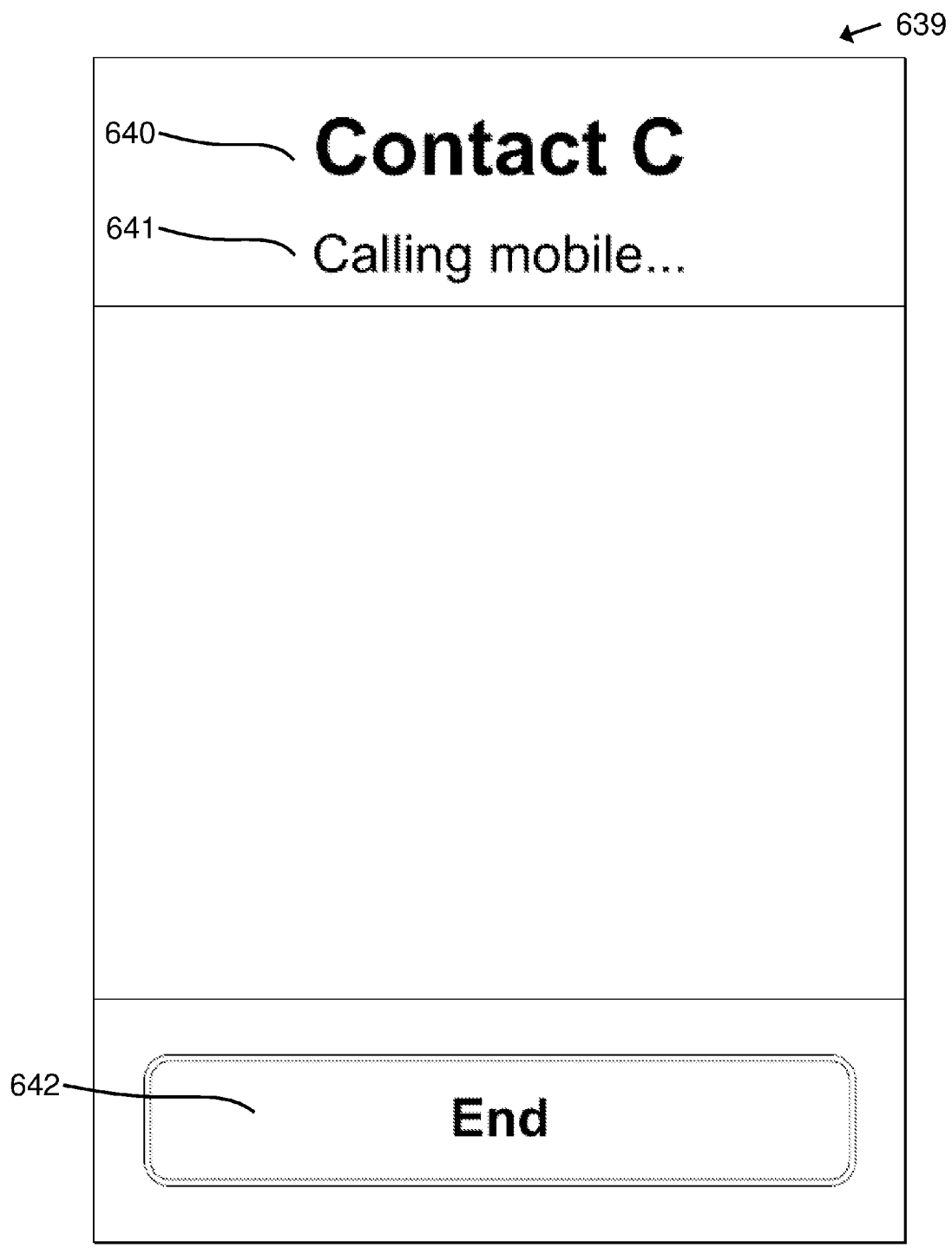
FIG. 6 is a representation of a telephone call dialing screen according to some embodiments.

FIG. 6 is a representation of a telephone call dialing screen 600 displayed by the telephony application 104 on the display 106 of the mobile telephone 102 according to some embodiments. FIG. 6 shows the situation in which the user has indicated that they wish to initiate a phone call to contact C, by touching the touch-sensitive screen region 432 of the telephone call initiation screen 430 or by manually entering a telephony identifier associated with contact C via the touch-sensitive keypad region 535 of the manual identifier entry screen 534 and touching the "call" touch-sensitive screen region 538 or in some other way. The data communication application 109 is no longer the active application in the foreground, but is running in the background.

The telephone call dialing screen 639 includes a called party display region 640 which displays contact information associated with the called party. In this case, the called party display region 640 displays the name of the called party ("Contact C"). However, the called party display region 640 may display an image associated with contact C, a telephony identifier associated with contact C, other contact information relating to contact C or no contact information at all.

The telephone call dialing screen 640 also includes a telephone call status display region 641 which identifies the current status of the telephone call. The telephone call status display region 641 is currently displaying the text "calling mobile" which indicates the telephone call setup is in progress, but that the called party has not yet accepted the telephone call setup request.

The telephone call dialing screen 639 also includes a touch-sensitive screen region 642 that displays the text "END". User input in within the touch-sensitive screen region 642 is passed to the telephony application 104, which initiates termination of telephone call setup to the called party.

Figure 7:
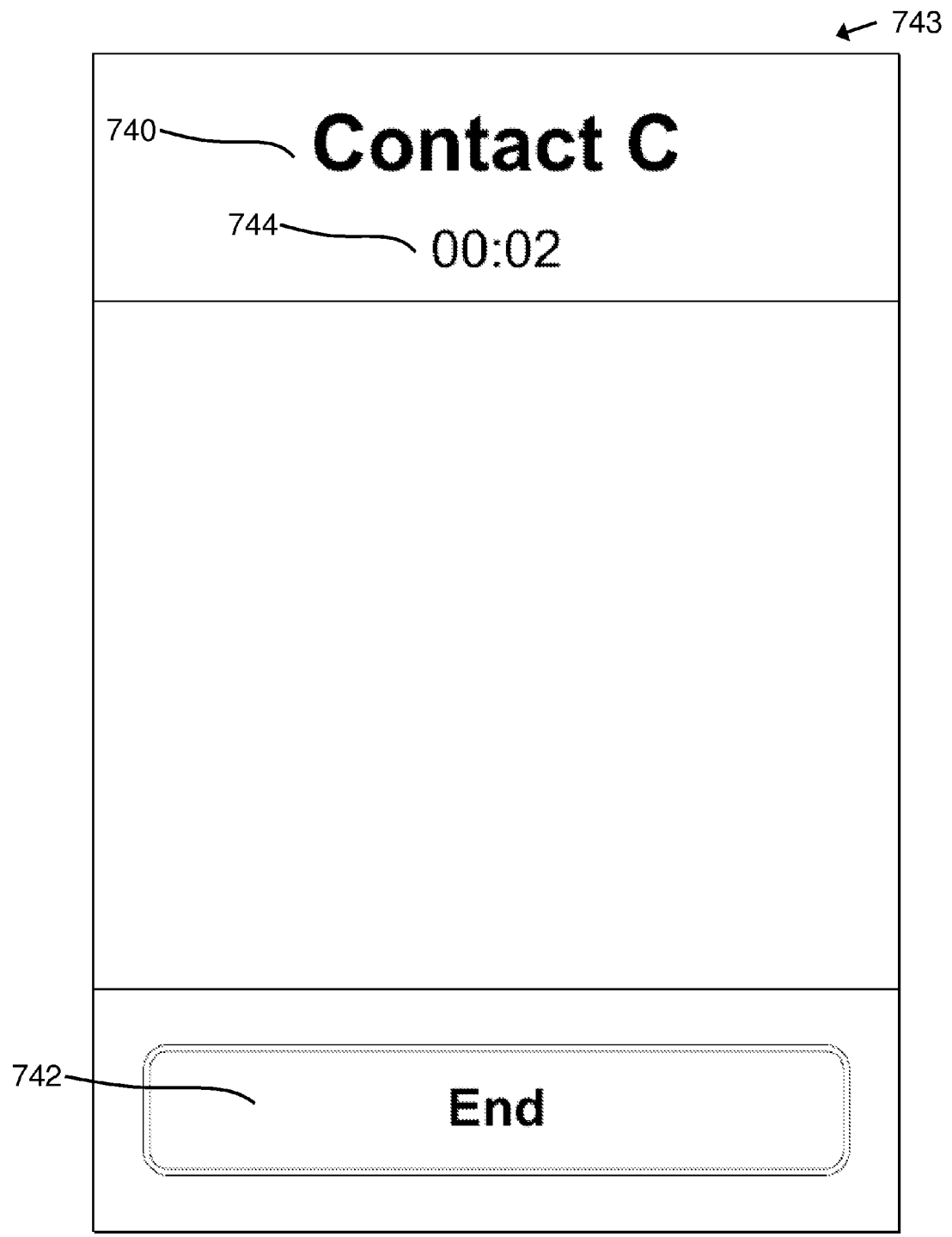
FIG. 7 is a representation of a telephone call connected screen according to some embodiments.

FIG. 7 is a representation of an in-call telephony screen 743 displayed by the telephony application 104 on the display 106 of the mobile telephone 102 according to some embodiments. FIG. 7 shows the situation in which the called party has accepted the telephone call setup request from the calling party and a telephone call has been established between the calling party and the called party (in this case contact C).

The telephone call connected screen 743 includes a called party display region 740 that corresponds to the called party display region 640 of the telephone call dialing screen 639 and displays the text "Contact C".

Similarly to the telephone call dialing screen 639, the telephone call connected screen 743 includes a telephone call status display region 744 which identifies the current status of the telephone call between the calling party and the called party. The telephone call status display region 744 is currently displaying the text "00:02" which indicates the telephone call has been established between the calling party and the called party for two seconds.

The telephone call dialing screen 743 also includes a touch-sensitive screen region 742 that displays the text "END" and corresponds to the touch-sensitive screen region 642 of the telephone call dialing screen 639.

At this stage, the data communication application 109, which transmitted the instruction comprising the called party identifier, to the telephony application 104 is still running in the background. The data communication application 109 determines that the telephone call has been established between the calling party and the called party, for example by determining that the call state associated with the telephony application 104 has changed from 'dialing' to 'connected'. In response, the data communication application 109 transmits data communication session setup information, identifying the called party, to the data communication server 111. The data communication server 111 can then determine that the telephone call has been established between the calling party and the called party and that it should establish the separate data communication session for the communication of data between the calling party and the called party.

Figure 8:
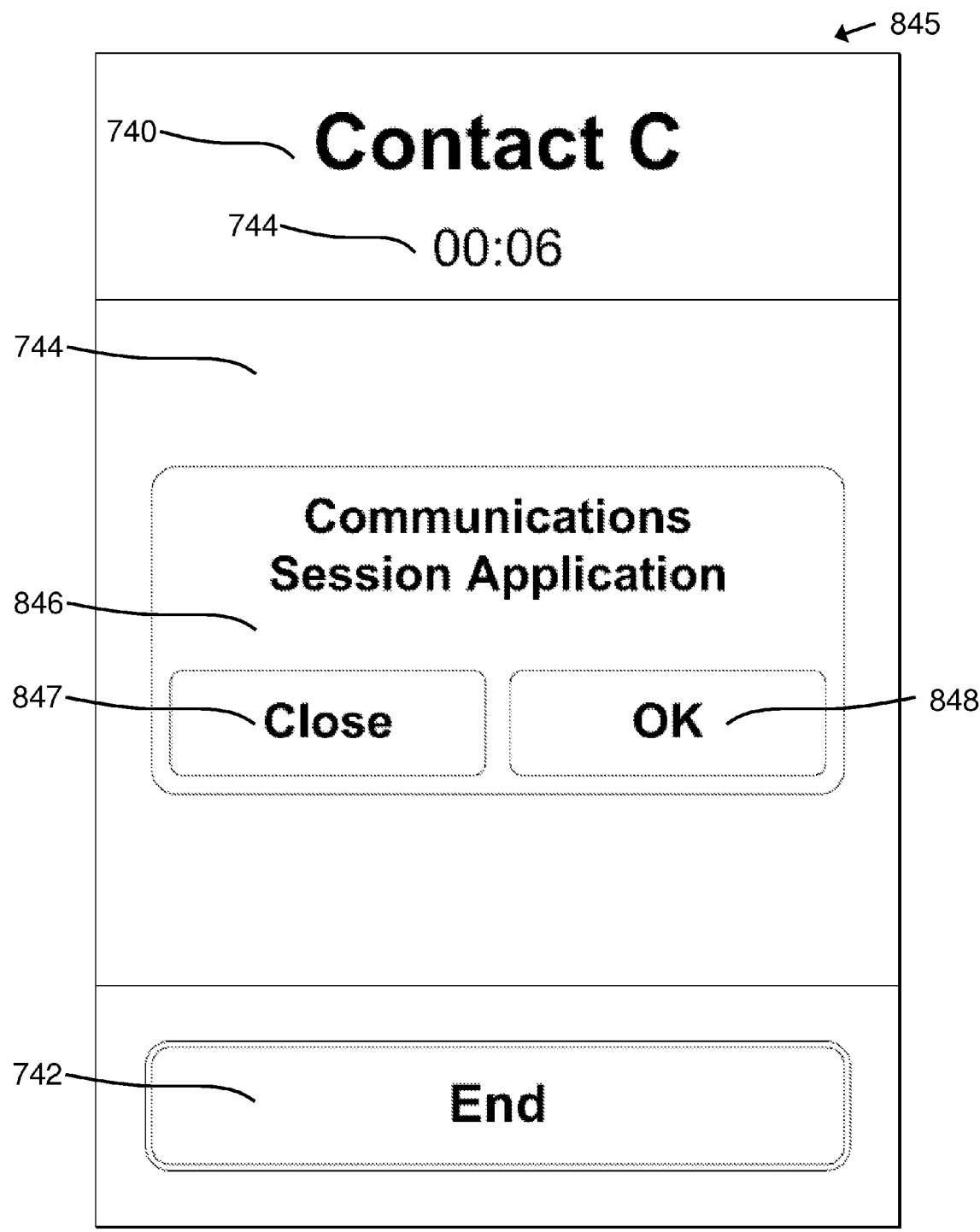
FIG. 8 is a representation of a screen according to some embodiments.

FIG. 8 is a representation of a screen 845 showing an in-call notification displayed by the operating system on the display 106 of the mobile telephone 102 according to some embodiments. FIG. 8 shows the telephone call connected screen 743 including the called party display region 740, the telephone call status display region 744 and the touch-sensitive screen region 742 displayed in the background with an alert message 846 displayed in the foreground.

The mobile telephone 102 receives a push notification from the data communication server 111 via the push notification server 115 for the data communication application 109. The push notification is sent by the data communication server 111 in response to correlating the two parties, that is to say in response to determining that the called party and calling party are involved in the same telephone call and that a data communication session separate from the telephone call should be established between the calling party and the called party.

Since the data communication application 109 is currently running in the background, the operating system displays the alert message 846 to the user to inform the user that some user action is required. In this case, the alert message 846 identifies that the data communication server 111 is able to establish a data communication session between the calling party and the called party. The alert message 846 includes a touch-sensitive screen region 847 which displays the text "Close" and a touch-sensitive screen region 848 which displays the text "OK". User input in either the touch-sensitive screen region 847 or the touch-sensitive screen region 848 is passed to the operating system, rather than to the telephony application 104.

If the user input is within the touch-sensitive screen region 847, then the operating system determines that the user does not wish to switch to the data communication application 109. In such cases, the operating system brings the telephony application 104 back to the foreground as the active application.

However, if the user input is in the touch-sensitive screen region 848, then the operating system determines that the user wishes to switch to the data communication application 109. In such cases, the operating system brings the data communication application 109 to the foreground as the active application and enables the telephony application 104 to continue running in the background. In such cases, the telephony application 104 is not suspended when it is moved to the background state, so that the calling party can continue communicating with the called party via the telephone call established between the calling party and the called party.

Figure 9:
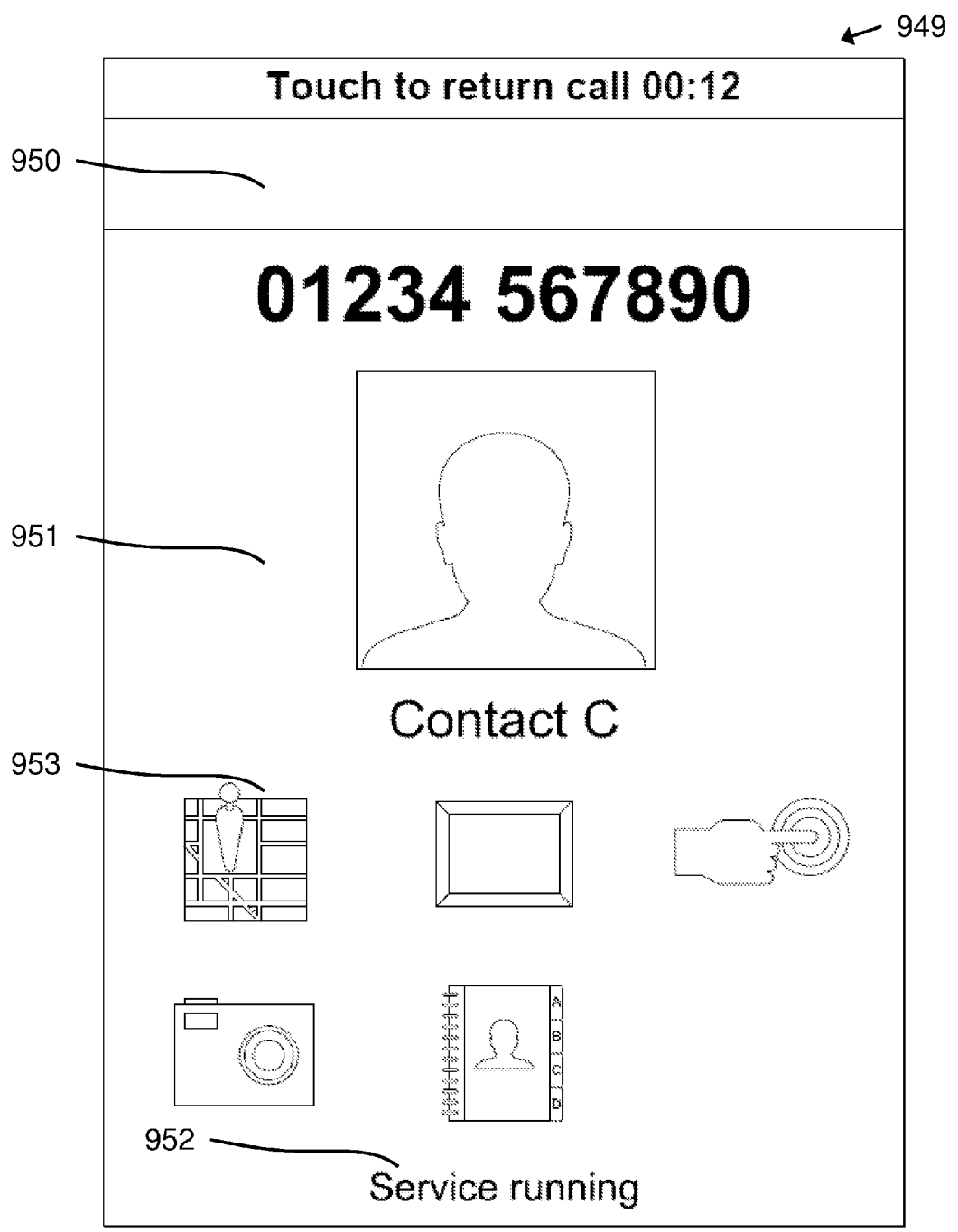
FIG. 9 is a representation of an in-call data communication screen according to some embodiments.

FIG. 9 is a representation of an in-call data communication screen 949 displayed by the data communication application 109 on the display 106 of the mobile telephone 102 according to some embodiments. FIG. 9 shows the situation in which the user touched the touch-sensitive screen region 848 displaying the text "OK" on the screen 845 to bring the data communication application user interface to the foreground.

The in-call data communication screen 949 includes a user interface element in the form of a touch-sensitive screen region 950 which, when selected by the user, is operable to cause the operating system to bring the telephony application user interface into the foreground and display the in-call telephony screen 743 and move the data communication application user interface into the background. The touch-sensitive screen region 950 displays appropriate text informing the user of its purpose.

The in-call data communication screen 949 includes a called party information display region 951 that displays contact information associated with the called party. In this example, the displayed contact information includes the contact name "Contact C", the dialed telephone number (that was included in the instruction to the telephony application 104) "01234 567890" and an image associated with contact C.

The in-call data communication screen 949 also includes a data communication session status display region 952, which is similar to the telephone call status display region 641 of the telephone call dialing screen 639 and the telephone call status display region 744 of the telephone call connected screen 743, but displays information concerning the status of the data communication session that is established between the calling party and the called party. At this stage, the data communication session status display region 952 displays the text "Service running" to indicate that the data communication session is currently established between the calling party and the called party.

The in-call data communication screen 949 also includes various user interface elements in the form of touch-sensitive screen regions, generally designated by reference 953, each including a representation of a data communication service which can be enabled during a telephone call, using communication via the data communication session and implemented by the data communication server 111. In some embodiments, the data communication services include location-sharing, stored file sharing, remote alert activation, photo capture and sharing, and contact-sharing. It will be appreciated that not all these services are necessarily provided and that other data communication services may be provided. User input within one of the various touch-sensitive screen regions 953 is passed to the data communication application 109. One or more further user input actions may be required to define one or more parameters of the service being initiated. The data communication application 109 may transmit an appropriate message, via the data communication session, to the data communication server 111 to identify which in-call service the user selected, based on this user input. The data communication server 111 then transmits a corresponding message to the called party, via the established data communication session, to initiate the appropriate service on the data communication application on the called party device. Alternatively, as described above, a direct connection between the calling party device and the called party device, separate to the telephone call, may be provided after the data communication session is established, and the calling party may transmit an appropriate message via the direct connection.

In the case of activation of a location-sharing service via the in-call data communication screen 949, user input on the calling party device may result in the current location of the calling party device being retrieved, and transmitted, to the called party device. The data communication application on the called party device may then retrieve and show a map of the calling party device location, based on the location information sent by the calling party device. In the case of a file-sharing service, user input on the calling party device may result in a file stored on the calling party device being selected, retrieved, and transmitted, to the called party device. The stored file may for example be an image file. The data communication application on the called party device may then show the image file contents, and allow the image file to be stored locally. In the case of a remote alert activation service, user input on the calling party device may result in an alerting command being transmitted to the calling party device. The data communication application on the called party device may then provide an audible, visual, haptic or other alert, based on the alert command sent by the calling party device. In the case of a photo capture and sharing service, user input on the calling party device may result in photo capture using a camera function on the calling party device, and the photo being transmitted, as an image file, to the called party device. The data communication application on the called party device may then show the image file contents, and allow the image file to be stored locally. In the case of a contact-sharing service, user input on the calling party device may result in contact details stored on the calling party device being selected, retrieved, and transmitted, to the called party device. The contact details may for example include a telephone number of a stored contact. The data communication application on the called party device may then show the contact details, and allow the contact details to be stored locally.

Various measures (for example a method of controlling communications equipment in a telecommunications network, a computer program product comprising a non-transitory computer-readable storage medium having stored thereon computer-readable instructions executable by communications equipment to perform the method, and communications equipment) are provided. The communications equipment is associated with a calling party. The communications equipment may have a telephony function for handling telephone calls. The telephony function may have having an associated first user interface. The communications equipment may have a data communication application for handling data communication sessions. The data communication application may have an associated second user interface. A called party identifier may be collected via the second user interface associated with the data communication application in response to user input at the communications equipment. A telephone call may be set up between the calling party and a called party using the telephony function on the basis of the called party identifier collected by the data communication application. Data communication session setup information, comprising information identifying the called party, may be transmitted on the basis of the called party identifier collected by the data communication application. The data communication session setup information may be for establishing a data communication session separate from the telephone call for the communication of data between the calling party and the called party.

Hence, a data communication session can be established, separately from the telephone call, for the communication of data with the called party. This is particularly beneficial in situations in which the data communication application is unable to receive call party details from the telephony function, which is typically used to initiate telephone call setup. In such situations, the called party may be identified in the data communication session setup information so that the data communication session can be established between the calling party and the called party. This may be more convenient for the user of the communication device than having to identify the called party twice; once for the purpose of setting up the telephone call and once, again, for the purpose of identifying the called party in the data communication session setup information.

In some embodiments, the method is performed by the data communication application. Such embodiments provide an application that can perform such control of the communications equipment. In such embodiments, a user of the communications equipment may conveniently only need to interact with the data communication application to initiate telephone call setup to the called party and also to enable setup of the data communication session.

In some embodiments, the communications equipment comprises an operating system and the telephony function forms part of the operating system. Such embodiments provide an arrangement by means of which the telephone call can be set up, using a telephony function that is likely to be familiar to the user of the communications equipment.

In some embodiments, an instruction comprising the called party identifier is passed from the data communication application to the telephony function to initiate setup of the telephone call between the calling party and the called party. Such embodiments provide an arrangement by means of which to set up the telephone call in a convenient manner, using the telephony function.

In some embodiments, a first instruction comprising the called party identifier is transmitted from the data communication application to an intermediate application at the communications equipment, the intermediate application being configured to transmit a second instruction comprising the called party identifier to the telephony function in response to receiving the first instruction from the data communication application. Such embodiments may facilitate telephone call setup in circumstances in which the data communication application cannot provide a telephone call set up instruction directly to the telephony function.

In some embodiments, the intermediate application comprises a web browser application and the first instruction comprises a Uniform Resource Locator (URL) comprising a URL-type identifier and the called party identifier, the URL-type identifier identifying the URL as an instruction to initiate setup of the telephone call. Such embodiments provide an arrangement by means of which telephone call setup can be initiated.

In some embodiments, the data communication session setup information comprises the called party identifier collected by the data communication application. Such embodiments facilitate identification of the called party for the purposes of establishing the separate data communication session.

In some embodiments, the second user interface is configured to display information identifying a called party identifier, along with one or more interface elements for initiating data communication functions via said separate data communication session, during the telephone call. Such embodiments facilitate communication of data with the called party.

In some embodiments, the first user interface include a first numeric dialer screen and the second user interface includes a second, different numeric dialer screen. Such embodiments provide a convenient arrangement for identifying the called party.

In some embodiments, the first user interface includes a first address book lookup screen and the second user interface includes a second, different address book lookup screen. Such embodiments provide a convenient arrangement for identifying the called party.

In some embodiments, the telecommunications network comprises a data communication server and the data communication session setup information is transmitted to the data communication server. Such embodiments provide an arrangement for establishing the data communication session.

In some embodiments, the data communication server initiates setup of at least a part of the telephone call between the calling party and the called party. In such embodiments, the data communication server may be involved both in establishing the data communication session and setting up the telephone call. This may enable the data communication server to retain some control over the telephone call and/or to provide additional functionality in relation to the telephone call, such as recording media data transmitted during the telephone call.

In some embodiments, a call status of the telephony function is determined, and status information is transmitted to the data communication server if it is determined that a telephone call is established via the telephony function. Such embodiments enable the establishment of the data communication session on the basis of the establishment of the telephone call. In such embodiments, the data communication session need not be established if the telephony call is not established.

The above embodiments are to be understood as illustrative examples. Further embodiments are envisaged.

In the embodiments described above, the mobile telephone 102 initiates telephone call setup to a called party. However, the mobile telephone 102 could receive an incoming telephone call setup request from a calling party. In such cases, an incoming telephone call setup request screen is displayed by the telephony application 104 on the display 106 of the mobile telephone 102. The incoming telephone call setup request screen includes a calling party display region which displays contact information (such as a name and telephone number) associated with the calling party and touch-sensitive screen regions for accepting or declining the incoming telephone call setup request. If the user of the mobile telephone 102 accepts the incoming telephone call setup request, the data communication application 109 which is running in the background determines that the telephone call has been established and may transmit an appropriate message to the data communication server 111 to inform the data communication server 111 that the telephone call has been established.

In some cases, the data communication application 109 does not have access to the call party details. However, if the call party details are available to the data communication server 111 (for example if they were transmitted to the data communication server 111 by the calling party), then the data communication application 109 may indicate that the telephone call has been established, on which basis the data communication server 111 can determine that the data communication session should be established separately from the telephone call for the communication of data between the calling party and called party.

Following such determination, the data communication server 111 transmits a notification to the mobile telephone 102 via the push notification server 115, which causes an alert message, such as the alert message 846 described above with reference to FIG. 8 to be displayed. The user can then action the alert message and switch to the data communication application 109 to access the additional service provided by the communication service provider as described above.

Furthermore, although the called and calling party communications equipment 102, 103 have been described above as being smart mobile telephones, one or both of the called and calling party communications equipment 102, 103 may be or may comprise a non-mobile computing device and/or a computing device without telephony capabilities such as a personal computer (PC) or suchlike.

Furthermore, although the mobile telephones 102, 103 have been described as being Apple™ iPhones™ implementing iOS™ as an operating system, it will be appreciated that other types of mobile telephone are envisaged, for example mobile telephones that run an Android™, Symbian™, Blackberry™ or Windows Phone™ operating system.

Furthermore, although telephone call setup has been described in the form of an outgoing setup request from the telephony function 104, 113, it is envisaged that the data communication server 111 could perform telephone call setup to the calling and called party based on telephone call setup information received via the data communication application 109. In such cases, instead of the data communication application 109 transmitting an instruction to the telephony function 104, 113 to initiate telephone call setup, the data communication application 109 could transmit telephone call setup information, comprising the called party identifier, to the data communication server 111. The data communication server 111 could then set up a telephone call leg to the called party and another telephone call leg to the calling party and bridge the two separate telephone call legs to establish a telephone call between the calling party and the called party. This enables the 111 to retain an element of control over the telephone call.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of controlling communications equipment in a telecommunications network, the communications equipment being associated with a calling party and having:
    a telephony application configured to handle telephone calls, the telephony application having an associated first user interface; and
    a data communication application configured to handle data communication sessions,
        wherein the data communication application is separate from the telephony application, has an associated second user interface, and is configured to establish a data communication session for the communication of data between the calling party and a called party, and
        wherein the data communication session is separate from a telephone call between the calling party and the called party, the method comprising:
    the data communication application collecting a called party identifier via the second user interface in response to user input at the communications equipment, wherein the data communication application is unable to receive the called party identifier from the telephony application;
    the data communication application transmitting a first instruction comprising the called party identifier to an intermediate application at the communications equipment, the intermediate application being configured to transmit a second instruction comprising the called party identifier to the telephony application in response to receiving the first instruction from the data communication application to initiate setup of the telephone call between the calling party and the called party, wherein the intermediate application comprises a web browser application and wherein the first instruction comprises a Uniform Resource Locator (URL) comprising a URL-type identifier and the called party identifier, the URL-type identifier identifying the URL as an instruction to initiate setup of the telephone call; and the data communication application transmitting data communication session setup information, comprising information identifying the called party, on the basis of the called party identifier collected by the data communication application, the data communication session setup information being for establishing the data communication session separate from the telephone call for the communication of data between the calling party and the called party.

2. The method of claim 1, wherein the communications equipment comprises an operating system and wherein the telephony application forms part of the operating system.

3. The method of claim 1, wherein the data communication session setup information comprises the called party identifier collected by the data communication application.

4. The method of claim 1, wherein the second user interface is configured to display information identifying the called party, along with one or more interface elements for initiating data communication functions via said separate data communication session, during the telephone call.

5. The method of claim 1, wherein the first user interface includes a first numeric dialer screen and wherein the second user interface includes a second, different numeric dialer screen.

6. The method of claim 1, wherein the first user interface includes a first address book lookup screen and wherein the second user interface includes a second, different address book lookup screen.

7. The method of claim 1, wherein the telecommunications network comprises a data communication server and wherein the method comprises transmitting the data communication session setup information to the data communication server.

8. The method of claim 7, wherein the data communication server is configured to initiate setup of at least a part of the telephone call between the calling party and the called party.

9. The method of claim 7, further comprising:
determining a call status of the telephony application; and
transmitting status information to the data communication server if it is determined that a telephone call is established via the telephony application.

10. The method of claim 1, wherein the data communication application is downloaded onto the communications equipment.

11. A computer program product comprising a non-transitory computer-readable storage medium having computer-readable instructions stored thereon, the computer-readable instructions being executable by communications equipment, the communications equipment being associated with a calling party and comprising a telephony application, for handling telephone calls and having an associated first user interface, and comprising a data communication application, for handling data communication sessions and having an associated second user interface, the data communication application being separate from the telephony application and being configured to establish a data communication session for the communication of data between the calling party and a called party, the data communication session being separate from a telephone call between the calling party and the called party, the computer-readable instructions being executable to cause the data communication application to perform a method comprising:

collecting a called party identifier via the second user interface associated with the data communication application in response to user input at the communications equipment, wherein the data communication application is unable to receive the called party identifier from the telephony application;

transmitting a first instruction comprising the called party identifier to an intermediate application at the communications equipment, the intermediate application being configured to transmit a second instruction comprising the called party identifier to the telephony application in response to receiving the first instruction from the data communication application to initiate setup of the telephone call between the calling party and the called party, wherein the intermediate application comprises a web browser application and wherein the first instruction comprises a Uniform Resource Locator (URL) comprising a URL-type identifier and the called party identifier, the URL-type identifier identifying the URL as an instruction to initiate setup of the telephone call; and transmitting data communication session setup information, comprising information identifying the called party, on the basis of the called party identifier collected by the data communication application, the data communication session setup information being for establishing the data communication session separate from the telephone call for the communication of data between the calling party and the called party.

12. A communications system, comprising:
a telephony application configured to handle telephone calls, the telephony application having an associated first user interface; and
a data communication application configured to handle data communication sessions, the data communication application being separate from the telephony application and having an associated second user interface, the data communication application being configured to establish a data communication session for the communication of data between a calling party and a called party, the data communication session being separate from a telephone call between the calling party and the called party, the communications equipment being associated with the calling party, wherein the data communication application is configured to:

collect a called party identifier via the second user interface associated with the data communication application in response to user input at the communications equipment, wherein the data communication application is unable to receive the called party identifier from the telephony application;

transmit a first instruction comprising the called party identifier from the data communication application to an intermediate application at the communications equipment, the intermediate application being configured to transmit a second instruction comprising the called party identifier to the telephony application in response to receiving the first instruction from the data communication application to initiate setup of the telephone call between the calling party and the called party, wherein the intermediate application comprises a web browser application and wherein the first instruction comprises a Uniform Resource Locator (URL) comprising a URL-type identifier and the called party identifier, the URL-type identifier identifying the URL as an instruction to initiate setup of the telephone call; and transmit data communication session setup information, comprising information identifying the called party, on the basis of the called party identifier collected by the data communication application, into a telecommunications network, the data communication session setup information being for establishing the data communication session separate from the telephone call for the communication of data between the calling party and the called party.

\* \* \* \* \*